(12) United States Patent
McCune et al.

(10) Patent No.: US 8,764,604 B2
(45) Date of Patent: Jul. 1, 2014

(54) RING GEAR MOUNTING ARRANGEMENT WITH OIL SCAVENGE SCHEME

(75) Inventors: Michael E. McCune, Colchester, CT (US); Lawrence E. Portlock, Bethany, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/437,442

(22) Filed: Apr. 2, 2012

(65) Prior Publication Data
US 2012/0189430 A1 Jul. 26, 2012

Related U.S. Application Data

(63) Continuation of application No. 11/504,220, filed on Aug. 15, 2006.

(51) Int. Cl.
*F16H 57/04* (2010.01)

(52) U.S. Cl.
USPC ............................ 475/331; 475/159; 475/160

(58) Field of Classification Search
USPC ......................................... 475/159, 160, 331
See application file for complete search history.

(56) References Cited

U.S. PATENT DOCUMENTS

| | | | |
|---|---|---|---|
| 2,684,591 A | 7/1954 | Lundquist | |
| 3,160,026 A | 12/1964 | Rosen | |
| 3,352,178 A | 11/1967 | Lindgren et al. | |
| 3,722,323 A | 3/1973 | Welch | |
| 4,583,413 A | 4/1986 | Lack | |
| 4,896,499 A | 1/1990 | Rice | |
| 5,081,832 A | 1/1992 | Mowill | |
| 5,211,541 A | 5/1993 | Fledderjohn et al. | |
| 5,302,031 A | 4/1994 | Yuasa | |
| 5,391,125 A * | 2/1995 | Turra et al. | 475/346 |
| 5,433,674 A * | 7/1995 | Sheridan et al. | 475/346 |
| 5,466,198 A | 11/1995 | McKibbin et al. | |

(Continued)

FOREIGN PATENT DOCUMENTS

| | | |
|---|---|---|
| EP | 1114949 | 7/2001 |
| EP | 1876338 A2 | 1/2008 |

(Continued)

OTHER PUBLICATIONS

Japanese Office Action for Japanese Application No. 2007-202444, Aug. 3, 2010.

(Continued)

*Primary Examiner* — Derek D Knight
(74) *Attorney, Agent, or Firm* — Carlson, Gaskey & Olds, P.C.

(57) ABSTRACT

A turbine engine includes an input shaft and a fan shaft rotatable about an axis. The fan shaft supports fan blades. An epicyclic gear train is connected between the input shaft and the fan shaft. The epicyclic gear train includes a plurality of star gears, a carrier supporting the plurality of star gears, a sun gear that meshes with the plurality of star gears and a ring gear surrounding and meshing with the plurality of star gears such that the sun gear is rotatable in a first direction and the ring gear is rotatable in a second, opposite direction. The ring gear includes first and second portions that each have an inner periphery with teeth. The first and second portions include respective recesses facing one another to provide an internal annular cavity.

16 Claims, 2 Drawing Sheets

(56) References Cited

U.S. PATENT DOCUMENTS

| | | | |
|---|---|---|---|
| 5,472,383 A * | 12/1995 | McKibbin | 475/159 |
| 6,223,616 B1 * | 5/2001 | Sheridan | 74/468 |
| 6,402,654 B1 | 6/2002 | Lanzon et al. | |
| 6,530,858 B1 | 3/2003 | Usoro et al. | |
| 6,669,597 B1 | 12/2003 | Usoro et al. | |
| 6,732,502 B2 | 5/2004 | Seda et al. | |
| 7,021,042 B2 * | 4/2006 | Law | 60/226.1 |
| 7,591,754 B2 | 9/2009 | Duong et al. | |
| 7,662,059 B2 | 2/2010 | McCune | |
| 7,704,178 B2 * | 4/2010 | Sheridan et al. | 475/159 |
| 8,074,440 B2 | 12/2011 | Kohlenberg | |
| 2002/0064327 A1 | 5/2002 | Toda et al. | |
| 2004/0112041 A1 | 6/2004 | Law | |
| 2005/0026745 A1 | 2/2005 | Mitrovic | |
| 2008/0006018 A1 | 1/2008 | Sheridan et al. | |
| 2008/0044276 A1 | 2/2008 | McCune et al. | |
| 2008/0116009 A1 | 5/2008 | Sheridan et al. | |
| 2009/0056306 A1 | 3/2009 | Suciu et al. | |
| 2009/0090096 A1 | 4/2009 | Sheridan | |
| 2009/0293278 A1 | 12/2009 | Duong et al. | |
| 2009/0298640 A1 | 12/2009 | Duong et al. | |
| 2011/0130246 A1 | 6/2011 | McCune | |

FOREIGN PATENT DOCUMENTS

| | | |
|---|---|---|
| EP | 2224100 | 9/2010 |
| EP | 2559913 A1 | 2/2013 |
| FR | 1357038 | 4/1964 |
| JP | 46-36927 | 10/1971 |
| JP | 5-248267 A | 9/1993 |
| JP | 9-317833 A | 12/1997 |
| JP | 2001-208146 A | 8/2001 |
| JP | 39-20031 B2 | 5/2007 |

OTHER PUBLICATIONS

European Search Report for EP Application No. 07253078.5, Dec. 5, 2007.

European Search Report and Written Opinion for European Application No. EP 12 19 8136 completed on Aug. 21, 2013.

International Search Report and Written Opinion for International Application No. PCT/US2012/071906 completed on Aug. 22, 2013.

Dudley ("Gear Handbook: The design, Manufacture, and Application of Gears", p. 3-15).

* cited by examiner

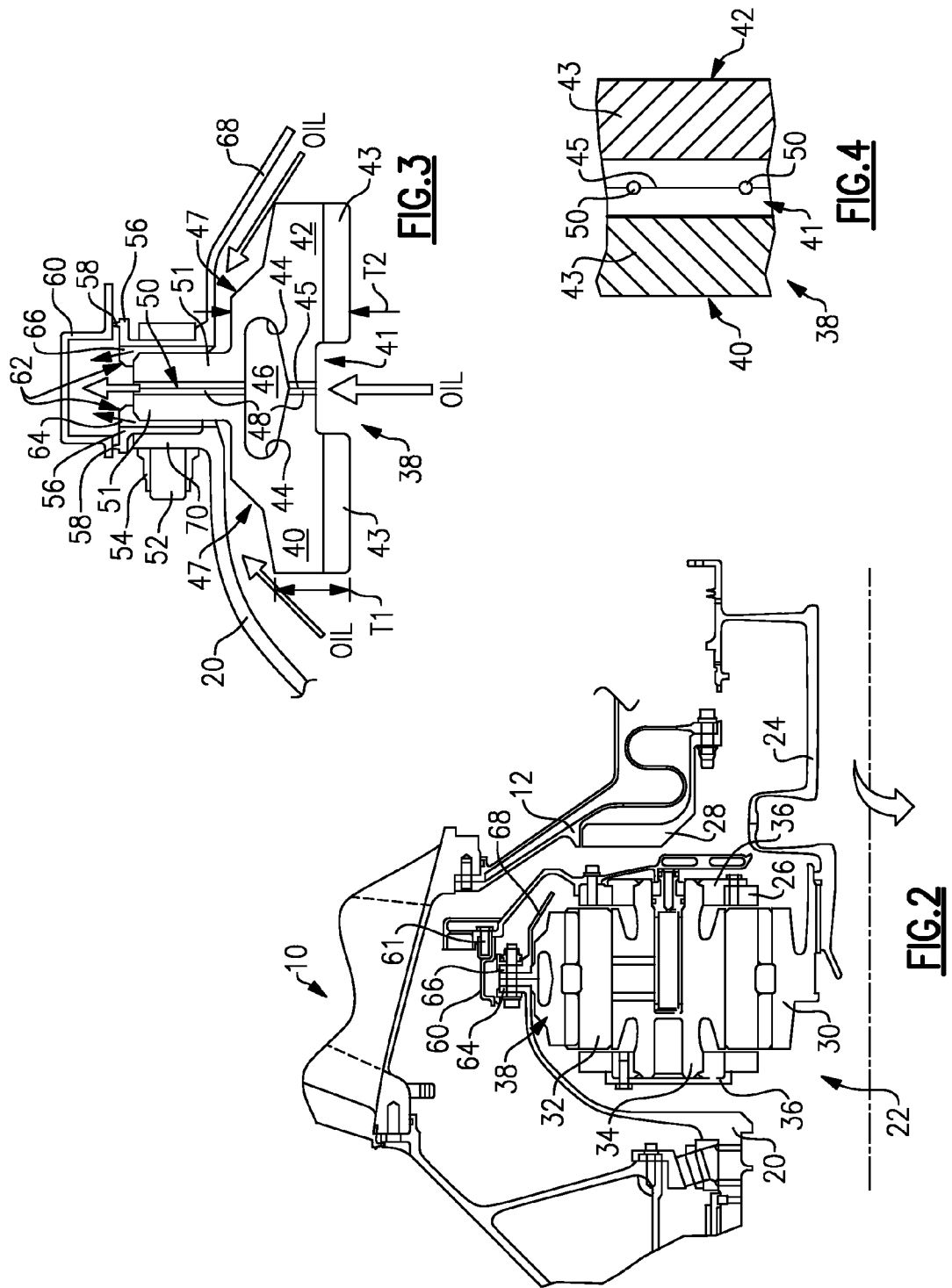

RING GEAR MOUNTING ARRANGEMENT WITH OIL SCAVENGE SCHEME

CROSS REFERENCE TO RELATED APPLICATIONS

The present disclosure is a continuation of U.S. patent application Ser. No. 11/504,220, filed Aug. 15, 2006.

BACKGROUND

This invention relates to a ring gear used in an epicyclic gear train of a gas turbine engine.

Gas turbine engines typically employ an epicyclic gear train connected to the turbine section of the engine, which is used to drive the turbo fan. In a typical epicyclic gear train, a sun gear receives rotational input from a turbine shaft through a compressor shaft. A carrier supports intermediate gears that surround and mesh with the sun gear. A ring gear surrounds and meshes with the intermediate gears. In arrangements in which the carrier is fixed against rotation, the intermediate gears are referred to as "star" gears and the ring gear is coupled to an output shaft that supports the turbo fan.

Typically, the ring gear is connected to the turbo fan shaft using a spline ring. The spline ring is secured to a flange of the turbo fan shaft using circumferentially arranged bolts. The spline ring includes splines opposite the flange that supports a splined outer circumferential surface of the ring gear. The ring gear typically includes first and second portions that provide teeth facing in opposite directions, which mesh with complimentary oppositely facing teeth of the star gears.

An epicyclic gear train must share the load between the gears within the system. As a result, the splined connection between the ring gear and spline ring is subject to wear under high loads and deflection. Since the spline connection requires radial clearance, it is difficult to get a repeatable balance of the turbo fan assembly. Balance can also deteriorate over time with spline wear.

SUMMARY OF THE INVENTION

A disclosed example turbine engine according to a non-limiting exemplary embodiment includes an epicyclic gear train including an input shaft and a fan shaft rotatable about an axis, the fan shaft supporting fan blades. An epicyclic gear train is connected between the input shaft. The fan shaft, the epicyclic gear train includes a plurality of star gears, a carrier supporting the plurality of star gears, a sun gear that meshes with the plurality of star gears and a ring gear surrounding and meshing with the plurality of star gears such that the sun gear is rotatable in a first direction and the ring gear is rotatable in a second, opposite direction. The ring gear includes first and second portions that each have an inner periphery with teeth, the first and second portions including respective recesses facing one another to provide an internal annular cavity.

In a further embodiment of any of the foregoing examples, the teeth on the inner periphery of the ring gear are exclusive teeth on the ring gear.

In a further embodiment of any of the foregoing examples, the first and second portions of the ring gear have an outer circumferential surface opposite the teeth that provides a first thickness and a second, greater thickness axially inward from the first thickness.

In a further embodiment of any of the foregoing examples, the respective outer circumferential surfaces are generally S-shaped.

In a further embodiment of any of the foregoing examples, the first and second portions of the ring gear each have an outer circumferential surface opposite the teeth and a flange projecting radially outwardly from the respective outer circumferential surface, the flanges including respective grooves therein.

In a further embodiment of any of the foregoing examples, the respective grooves are radially elongated and each of the respective grooves opens to a terminal, radially outward end of the respective flange.

In a further embodiment of any of the foregoing examples, each of the respective grooves opens at a radially inner end to the internal annular cavity.

In a further embodiment of any of the foregoing examples, the internal annular cavity is axially elongated relative to a radial dimension of the internal annular cavity.

In a further embodiment of any of the foregoing examples, the first and second portions of the ring gear have an outer circumferential surface opposite the teeth, each of the respective outer circumferential surfaces including multiple inclined surfaces with regard to a central axis of the ring gear.

In a further embodiment of any of the foregoing examples, the multiple inclined surfaces includes a first inclined surface joined at one axial end thereof with a second inclined surface, the first inclined surface having a different slope than the second inclined surface.

In a further embodiment of any of the foregoing examples, each of the respective outer circumferential surfaces includes a non-sloped surface joined with the second inclined surface.

In a further embodiment of any of the foregoing examples, the first and second portions define a passage there between that opens at one radial end to the inner periphery and at an opposite radial end to a tip of a flange projecting radially outwardly from the outer circumferential surface.

In a further embodiment of any of the foregoing examples, the first and second portions of the ring gear have an outer circumferential surface opposite the teeth, the first and second portions each including a flange projecting radially outwardly from the outer circumferential surface, the first and second portions each being a monolithic structure.

In a further embodiment of any of the foregoing examples, the teeth on the first portion are angled in a first direction, and the teeth on the second portion are angled in a second direction opposite the first direction, a rotational direction of the ring gear forcing the first and second portions toward one another at the radial interface.

BRIEF DESCRIPTION OF THE DRAWINGS

FIG. 2 is an enlarged cross-sectional view of the epicyclic gear train shown in FIG. 1.

FIG. 3 is an enlarged cross-sectional view of an example ring gear similar to the arrangement shown in FIG. 2.

FIG. 4 is a view of the ring gear shown in FIG. 3 viewed in a direction that faces the teeth of the ring gear in FIG. 3.

DETAILED DESCRIPTION OF THE PREFERRED EMBODIMENT

Figure 1:
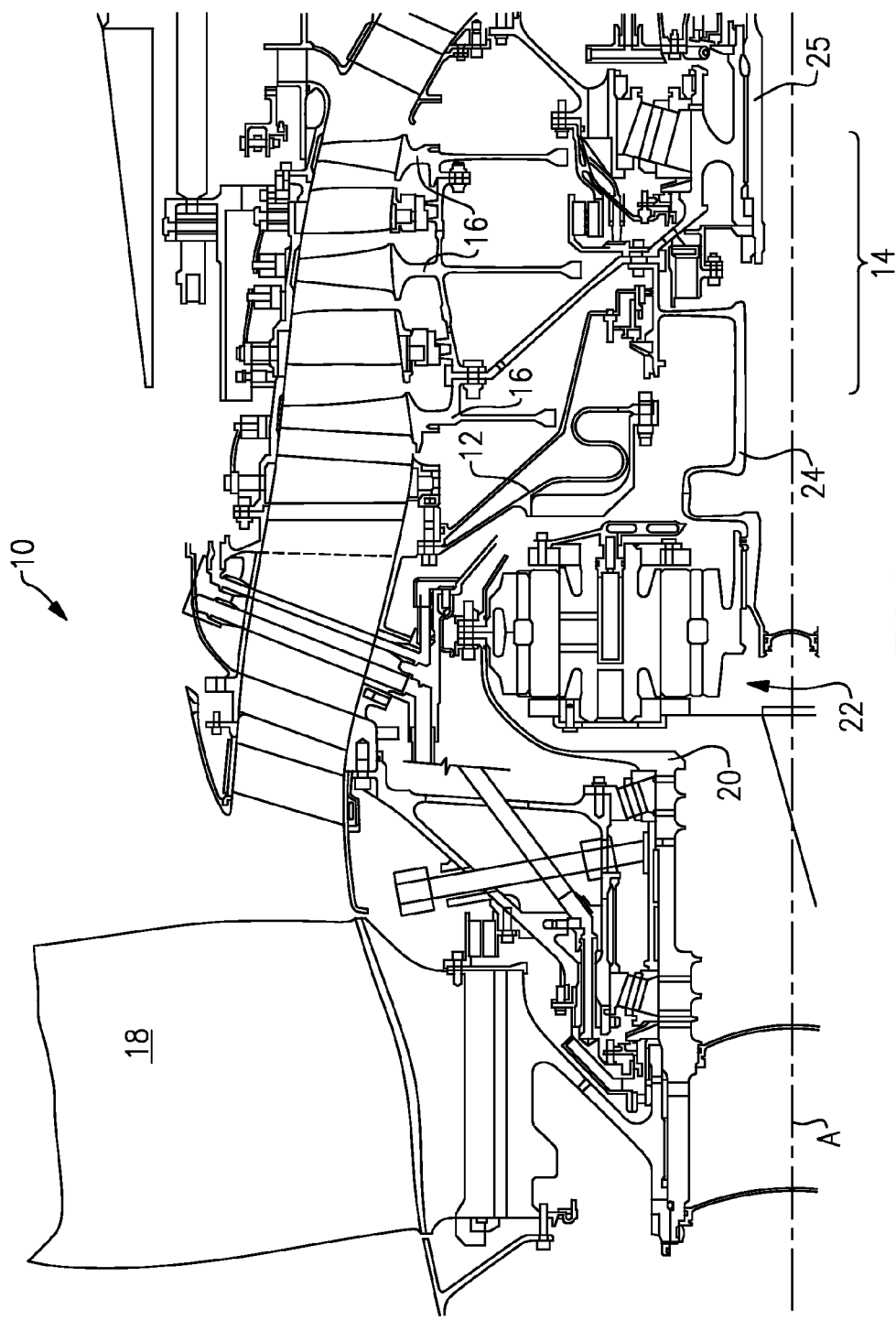
FIG. 1 is a partial cross-sectional view of a front portion of a gas turbine engine illustrating a turbo fan, epicyclic gear train and a compressor section.

A portion of a gas turbine engine 10 is shown schematically in FIG. 1. The turbine engine 10 includes a fixed housing 12 that is constructed from numerous pieces secured to one another. A compressor section 14 having compressor hubs 16 with blades are driven by a turbine shaft 25 about an axis A. A turbo fan 18 is supported on a turbo fan shaft 20 that is driven by a compressor shaft 24, which supports the compressor hubs 16, through an epicyclic gear train 22.

In the example arrangement shown, the epicyclic gear train 22 is a star gear train. Referring to FIG. 2, the epicyclic gear train 22 includes a sun gear 30 that is connected to the compressor shaft 24, which provides rotational input, by a splined connection. A carrier 26 is fixed to the housing 12 by a torque frame 28 using fingers (not shown) known in the art. The carrier 26 supports star gears 32 using journal bearings 34 that are coupled to the sun gear 30 by meshed interfaces between the teeth of sun and star gears 30, 32. Multiple star gears 32 are arranged circumferentially about the sun gear 30. Retainers 36 retain the journal bearings 34 to the carrier 26. A ring gear 38 surrounds the carrier 26 and is coupled to the star gears 32 by meshed interfaces. The ring gear 38, which provides rotational output, is secured to the turbo fan shaft 20 by circumferentially arranged fastening elements, which are described in more detail below. Due to the use of the sun gear 30 in the described arrangement of the epicyclic gear train 22, a worker of ordinary skill in the art would recognize that the sun gear 30 is rotatable in a first direction and the ring gear 38 is rotatable in a second, opposite direction.

Referring to FIGS. 3 and 4, the ring gear 38 is a two-piece construction having first and second portions 40, 42. The first and second portions 40, 42 abut one another at a radial interface 45. As shown in FIG. 4, a trough 41 separates oppositely angled teeth 43 on each of the first and second portions 40, 42. (schematically represented by the upwardly angled lines and second portions 40, 42 in FIG. 4) The teeth 43 mesh with corresponding teeth on the star gears 32. The oppositely angled arrangement of teeth 43 forces the first and second portions 40, 42 toward one another at the radial interface 45 during operation of the epicyclic gear train 22. The back side of the first and second portions 40, 42 includes a generally S-shaped outer circumferential surface 47 that, coupled with a change in thickness, provides structural rigidity and resistance to overturning moments. The first and second portions 40, 42 have a first thickness T1 that is less than a second thickness T2 arranged axially inwardly from the first thickness T1. The first and second portions 40, 42 include facing recesses 44 that form an internal annular cavity 46.

The first and second portions 40, 42 include flanges 51 that extend radially outward away from the teeth 43. The turbo fan shaft 20 includes a radially outwardly extending flange 70 that is secured to the flanges 51 by circumferentially arranged bolts 52 and nuts 54, which axially constrain and affix the turbo fan shaft 20 and ring gear 38 relative to one another. Thus, the spline ring is eliminated, which also reduces heat generated from windage and churning that resulted from the sharp edges and surface area of the splines. The turbo fan shaft 20 and ring gear 38 can be rotationally balanced with one another since radial movement resulting from the use of splines is eliminated. An oil baffle 68 is also secured to the flanges 51, 70 and balanced with the assembly.

Seals 56 having knife edges 58 are secured to the flanges 51, 70. The first and second portions 40, 42 have grooves 48 at the radial interface 45 that form a hole 50, which expels oil through the ring gear 38 to a gutter 60 that is secured to the carrier 26 with fasteners 61 (FIG. 2). The direct radial flow path provided by the grooves 48 reduces windage and churning by avoiding the axial flow path change that existed with splines. That is, the oil had to flow radially and then axially to exit through the spline interface. The gutter 60 is constructed from a soft material such as aluminum so that the knife edges 58, which are constructed from steel, can cut into the aluminum if they interfere. Referring to FIG. 3, the seals 56 also include oil return passages 62 provided by first and second slots 64 in the seals 56, which permit oil on either side of the ring gear 38 to drain into the gutter 60. In the example shown in FIG. 2, the first and second slots 64, 66 are instead provided in the flange 70 and oil baffle 68, respectively.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A turbine engine comprising:
an input shaft and a fan shaft rotatable about an axis, the fan shaft supporting fan blades;
an epicyclic gear train connected between the input shaft and the fan shaft, the epicyclic gear train including a plurality of star gears, a carrier supporting the plurality of star gears, a sun gear that meshes with the plurality of star gears and a ring gear surrounding and meshing with the plurality of star gears such that the sun gear is rotatable in a first direction and the ring gear is rotatable in a second, opposite direction, the ring gear including first and second portions that each have an inner periphery with teeth, the first and second portions including respective recesses facing one another to provide an internal annular cavity, the first and second portions of the ring gear each having an outer circumferential surface opposite the teeth and a respective flange projecting radially outwardly from the respective outer circumferential surface, the flanges including respective grooves therein; and
a seal adjacent the flange, the seal including a slot configured to permit oil to pass through the seal to drain into a gutter outwards of the flange.

2. The turbine engine according to claim 1, wherein the teeth on the inner periphery of the ring gear are exclusive teeth on the ring gear.

3. The turbine engine according to claim 1, wherein the internal annular cavity is axially elongated relative to a radial dimension of the internal annular cavity.

4. The turbine engine according to claim 1, each of the respective outer circumferential surfaces including multiple inclined surfaces with regard to a central axis of the ring gear.

5. The turbine engine according to claim 4, wherein the multiple inclined surfaces includes a first inclined surface joined at one axial end thereof with a second inclined surface, the first inclined surface having a different slope than the second inclined surface.

6. The turbine engine according to claim 5, wherein each of the respective outer circumferential surfaces includes a non-sloped surface joined with the second inclined surface.

7. The turbine engine according to claim 1, the first and second portions each being a monolithic structure.

8. The turbine engine according to claim 1, wherein the teeth on the first portion are angled in a first direction, and the teeth on the second portion are angled in a second direction opposite the first direction, a rotational direction of the ring gear forcing the first and second portions toward one another at the radial interface.

9. The turbine engine according to claim 1, wherein the respective grooves define a passage operable to convey oil though the ring gear, the passage intersecting the internal annular cavity and also extending through the flange and opening at the inner periphery and at a radially outer tip of the flange.

10. The turbine engine as recited in claim 1, wherein the seal includes a knife edge sealing against the gutter.

11. The turbine engine as recited in claim 10, wherein the seal is formed of a first material and the gutter is formed of a second material that is softer than the first material.

12. A turbine engine comprising:

a core drive shaft;

an epicyclical gear train connected to the drive shaft;

a fan shaft connected to the epicyclical gear train, the gear train having a rotatable ring gear that includes forward and aft portions, the forward and aft portions respectively including aft and forward facing radially extending grooves configured to form a guide channel for transferring oil between inner and outer peripheries of the ring gear, and an annular recesses configured to form an annular cavity, an outer periphery of the ring gear being dimensioned to provide the ring gear with a spring rate within a predetermined tolerance; and a seal at the outer periphery of the ring gear, the seal including a slot configured to permit oil to pass through the seal to drain into a gutter outwards of the guide channel.

13. The turbine engine as recited in claim 12, wherein the forward and aft portions each have a radial inner periphery with radially inner facing teeth which interface with a plurality of star gears of the epicyclical gear train, thereby biasing the forward and aft portion towards each other.

14. The turbine engine as recited in claim 12, wherein the epicyclical gear train includes a plurality of star gears, a carrier supporting the plurality of star gears, a sun gear that meshes with the plurality of star gears and the ring gear surrounding and meshing with the plurality of star gears such that the sun gear is rotatable in a first direction and the ring gear is rotatable in a second, opposite direction.

15. The turbine engine as recited in claim 12, wherein the seal includes a knife edge sealing against the gutter.

16. The turbine engine as recited in claim 15, wherein the seal is formed of a first material and the gutter is formed of a second material that is softer than the first material.

* * * * *